(12) United States Patent
Batzinger et al.

(10) Patent No.: US 6,922,641 B2
(45) Date of Patent: Jul. 26, 2005

(54) SYSTEM AND METHOD FOR MONITORING DEFECTS IN STRUCTURES

(75) Inventors: Thomas Batzinger, Burnt Hills, NY (US); Andrew May, Schenectady, NY (US); Peter Allison, Conroe, TX (US); Carl Lester, Porter Corners, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/664,196

(22) Filed: Sep. 17, 2003

(65) Prior Publication Data

US 2005/0075800 A1 Apr. 7, 2005

(51) Int. Cl.[7] ............................................... G01B 5/28
(52) U.S. Cl. ....................................................... 702/35
(58) Field of Search ............................. 702/35, 57, 38; 324/64, 696, 752, 765, 767, 718; 205/775, 83, 316; 70/394; 219/121; 73/804, 504; 385/1; 204/242; 600/587; 33/561

(56) References Cited

U.S. PATENT DOCUMENTS

| | | | |
|---|---|---|---|
| 2,476,943 A | | 7/1949 | Brady |
| 4,425,193 A | * | 1/1984 | Taylor .................... 205/775.5 |
| 4,656,595 A | * | 4/1987 | Hognestad ................. 702/38 |
| 4,683,419 A | * | 7/1987 | Neuelmann et al. ........ 324/718 |

FOREIGN PATENT DOCUMENTS

| | | |
|---|---|---|
| WO | 0169223 | 9/2001 |
| WO | 0239102 | 5/2002 |

OTHER PUBLICATIONS

"New Technique Monitors Pipeline Corrosion, Cracking,", Strommen et al., Oil and Gas Journal, vol. 91, No. 52, Dec. 27, 1993, pp. 88–92.

* cited by examiner

Primary Examiner—John Barlow
Assistant Examiner—Tung S. Lau
(74) Attorney, Agent, or Firm—William E. Powell, III; Christian G. Cabou

(57) ABSTRACT

A system and method for monitoring defects in a structure are provided. The system includes a power supply for supplying an electric current to a monitoring area of the structure and a reference; a measurement circuit for measuring a potential drop across at least two contact points of the monitoring area and at least two contact points of the reference; and a processor adapted to determine a ratio of the monitoring area potential drop to the reference potential drop indicative of a percentage change in a thickness of the structure. The method includes the steps of supplying the current to the monitoring area and the reference; measuring a first potential drop across the monitoring area and the reference; and determining the ratio indicative of the percentage change in the thickness of the structure.

20 Claims, 3 Drawing Sheets

SYSTEM AND METHOD FOR MONITORING DEFECTS IN STRUCTURES

BACKGROUND OF THE INVENTION

This disclosure relates generally to systems and methods for monitoring of structures, and more particularly, to systems and methods for continuously monitoring structures, e.g., pipes and vessels, for defects such as wall thinning caused by corrosion.

The petroleum and chemical industry has been searching for a means to monitor the condition of piping and vessels in facilities used for a variety of product flow and product processing. During the normal operation of these facilities, corrosion and erosion occur as a result of various products flowing through pipes and vessels and lead to a thinning of the pipes' and vessels' walls. The result of this wall thinning can range from loss of production, due to pipe leaks, to catastrophic failures which present safety and property damage issues. The operating conditions of the piping and vessels ranges from ambient temperatures of the surrounding environment (−40 F to 120 F) to very elevated temperatures (1000 F). With this range of operating conditions, the industry has been actively searching for technologies that would allow for online monitoring of the conditions of the components in order to either mitigate the corrosion through chemical treatment or alert the plant operators of a serious condition that would require immediate attention.

The current technology to address the issue of corrosion in piping and vessel wall material includes ultrasonic wall thickness measurement, X-ray imaging of the pipe or vessel, visual inspection of the pipe or vessel as well as potential drop measurements. Ultrasonic, X-ray and visual inspection techniques often require the systems to be taken out of service or to be inoperative for a period of time to allow for the inspection process to be completed. The potential drop measurement systems currently available on the market allow for online measurements but are limited in their capability to detect the effects of corrosion in piping and vessel wall material. For example, conventional potential drop measurement systems do not have sufficient sensitivity for detecting low rates of corrosion due to noise generated from sequentially multiplexing various test points.

Other online measurement systems such as product sampling for corrosion products in the material flowing in the pipe or vessel have also been employed. These are sampling techniques that have limited value due to low volume of corrosion byproducts flowing with the desired fluids in pipes and vessels. These techniques are adequate for the detection of general corrosion where a greater concentration of corrosion byproducts are found in the fluid stream within pipes and vessels but these techniques are not applicable for the detection of local pitting which only introduces a small volume of corrosion byproduct in the fluid stream within the pipe of vessel.

Therefore, a need for techniques to monitor structures, e.g., pipes and vessels, for defects with little or no disruption to the operation of the facilities including such structures.

BREIF DESCRIPTION OF THE INVENTION

A system and method for monitoring defects in a structure are provided. This invention makes use of an electrical current flowing through the material of the structure, e.g., a pipe or thin walled vessel, and a set of electrodes or leads attached to the outside of the pipe or vessel and an appropriate reference to measure the potential (voltage) drop between the attached electrodes. The measured potential drop between the attached electrodes will increase as a result of corrosion. As the thickness of the pipe or vessel wall is reduced due to corrosion, the electrical resistance will increase causing a greater potential drop. Use of an appropriate reference sample will allow this measurement to be taken accurately without variation caused by thermocouple effects, power-line noise interference, offset and gain drift of electronic components or other effects that typically cause noise when measuring small potential differences.

According to an aspect of the invention, a system for monitoring defects in a structure is provided. The system comprises a power supply for supplying an electric current to a monitoring area of the structure and a reference; a measurement circuit for measuring a potential drop across at least two contact points of the monitoring area and at least two contact points of the reference; and a processor adapted to determine a ratio of the monitoring area potential drop to the reference potential drop indicative of a percentage change in a thickness of the structure.

According to another aspect of the invention, a method for monitoring defects in a structure is provided. The method comprises the steps of supplying an electric current to a monitoring area of the structure and a reference; measuring a first potential drop across at least two contact points of the monitoring area and a first potential drop across at least two contact points of the reference; and determining a ratio of the monitoring area potential drop to the reference potential drop indicative of a percentage change in a thickness of the structure.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF THE INVENTION

Figure 1:
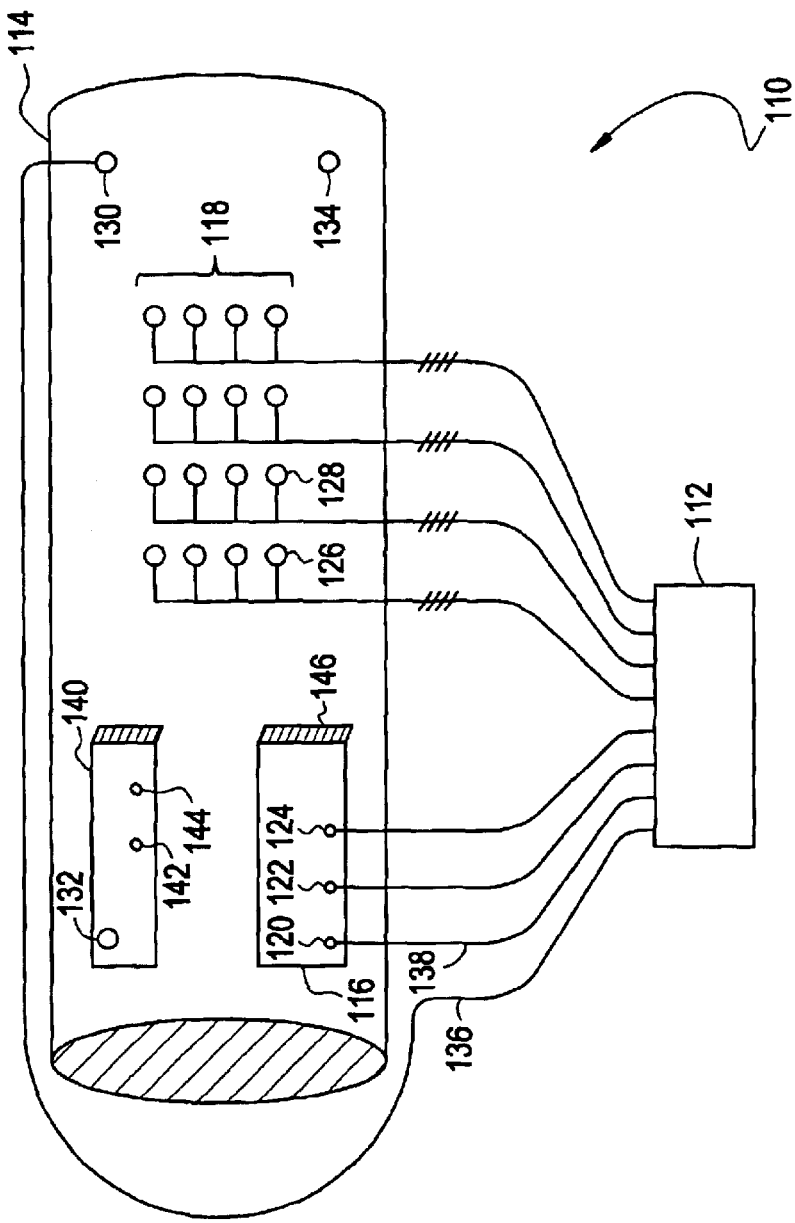
FIG. 1 illustrates an embodiment of a system for monitoring defects in a structure.

Preferred embodiments of the present invention will be described hereinbelow with reference to the accompanying drawings. In the following description, well-known functions or constructions are not described in detail to avoid obscuring the invention in unnecessary detail.

A system and method to monitor defects in a structure, e.g., a pipe or vessel, and to directly determine and quantify the amount of remaining wall thickness of the structure are provided. The invention will monitor a predetermined area, e.g., a monitoring area, of a sample and determine the remaining thickness of the sample in the area. This data can then be used to determine the safety of plant operations based on comparison of the remaining wall thickness to the design limits of the sample determined through engineering means. The invention is suited for monitoring a pipe or vessel operating between, but not limited to, −40 F. to 1000 F. By injecting large drive currents, e.g., up to 1000 Amps, and signal averaging, embodiments of the invention will be sensitive to wall thickness changes of 0.1% wall thickness.

Embodiments of the invention employ a potential drop measurement method. The potential drop method requires current flowing in a pipe wall or vessel wall in a well understood pattern to allow for the potential drop or voltage to be measured at various locations on the pipe or vessel. The potential drop measured at various locations is governed by the following equation:

$$V=IR \qquad (1)$$

where V=potential drop (voltage), I=current and R=resistance. In the case of a pipe or vessel where the electrical resistance is very low (~mohms), the potential drop measured is very small (~mvolts). Assuming that a known current is flowing through the pipe or vessel wall material, the potential drop measured is a function of the wall thickness. Since these are very small voltages to measure, a reference component of the same material of the structure is used to provide corrections for temperature effects on the resistivity of the material. In addition, an embodiment of the invention will compensate and eliminate the thermocouple effects as well as offsets and gain variations due to the power supply and electronic components.

Measurement of the potential drop is accomplished while current is flowing from one electrical attachment, e.g., a lead or electrode, to another attachment. The current is removed and the potential drop is measured again. The two potential drop values are numerically subtracted then divided by an internal reference potential drop of the monitoring system yielding a corrected potential drop value without offsets and gain variations caused by a variety of effects. The same measurement is made on the reference component. The corrected potential drop measured on the sample, e.g., the pipe or vessel, is then divided by the corrected potential drop of the reference component yielding a ratio that represents the difference between the current flow between the structure wall and the reference. This ratio is directly proportional to the difference between the material thickness in the sample and the reference component.

Referring to FIG. 1, a system 110 for monitoring defects in a structure is illustrated. Generally, the monitoring system 110 will include a multi-channel monitoring apparatus 112 coupled to a structure 114 to be monitored. For purposes of illustration, the structure shown in FIG. 1 is a portion of a pipe. It is to be understood that embodiments of the system 110 may be used with any electrically conducting structure susceptible to defects, such as corrosion, pitting, cracks, etc. Exemplary structures may include pipes, vessels, tanks, as well as structures with complicated geometries such as weld regions, joints, valves and heat exchangers.

The structure 114 includes a reference component 116 and a monitoring area 118. The reference component 116 includes at least one current injection port 120 for applying a power source and at least one pair of contact points 122, 124 for measuring a potential drop of the reference component 116. The monitoring area 118 will also include at least one pair of contact points 126, 128. The structure 114 will also include a current injection port 130, which when in conjunction with current injection port 120 will allow electrical current to flow through the structure 114.

Optionally, the structure 114 may include at least one additional reference component 140 including at least one current injection port 132 and at least one pair of contact points 142, 144. Current injection port 132 may be used in conjunction with current injection port 134 for injecting current in multiple paths.

It is to be appreciated that the monitoring area 118 may include a plurality of pairs of contact points arranged in a sensing matrix for taking measurements of potential drops across the structure 114.

The reference component 116 will be electrically coupled to the structure 114, for example, by welding, in that, when leads 136, 138 of the monitoring apparatus 112 are coupled to current injection ports 130, 120, respectively, electrical current will flow from one current injection port to the other depending on the polarity of a power supply coupled to the leads 136, 138. The reference component 116 will be of the same material as the structure 114 and will contact the structure 114 at a weld line 146. Optionally, a gap between the reference component 116 and the structure 114 will be filled with a thermal conductive compound so the reference component 116 and the structure 114 will be at the same temperature. It is to be noted the compound is an electrically non-conductive compound, e.g., a heat sink compound.

Figure 2:
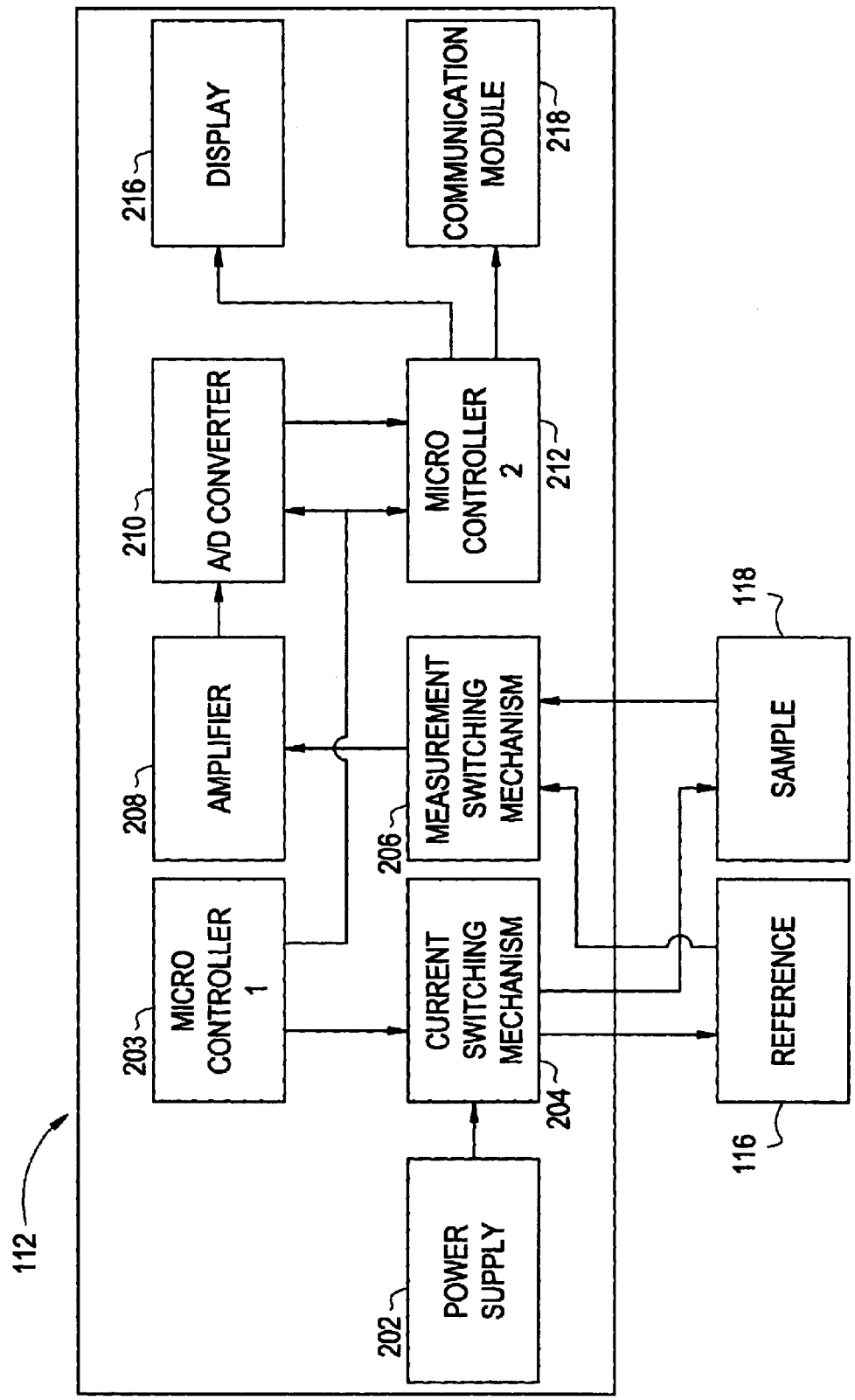
FIG. 2 is a block diagram of a monitoring apparatus for monitoring defects in a pipe.

Referring to FIG. 2, a block diagram of the monitoring apparatus 112 is illustrated. The monitoring apparatus 112 includes a power supply 202, e.g., a direct current (DC) battery, for supplying an electrical current to the structure 114. The leads 136, 138 are coupled from the power supply 202 to the current injection ports 120, 130 via current switching mechanism 204, e.g., a mercury displacement relay, power semiconductor device such as a power MOSFET or IGBT, or a double-pole, double-throw (DPDT) latching relay. The current switching mechanism 204 has two states. In a first state, a positive potential is applied to current injection port 120 and a negative potential is applied to current injection port 130 enabling current to flow from current injection port 120 to current injection port 130. In a second state, the current switching mechanism 204 creates an open circuit between the power supply 202 and the injections ports 120, 130 enabling an off-state reading, e.g., no current flow. The current switching mechanism 204 will be controlled by a first microcontroller 203, or processor, which will determine the state of the current switching mechanism 204 and initiate readings of potential drops as will be described below.

The monitoring apparatus 112 further includes a measurement switching mechanism 206. The measurement switching mechanism 206 may include a parallel array of DPDT latching relays. Double-pole double-throw (DPDT) latching relays are used to route the potential drop signals to facilitate efficient energy conversion and low-noise differential measurements of the potential drops.

In a first state, the measurement switching mechanism 206 will read potentials from the at least two contact points 122, 124 of the reference component 116 and, in a second state, will read potentials from the at least two contact points 126, 128 of the monitoring area 118. It is to be appreciated that if a plurality of pairs of contact points is utilized on the structure, all pairs will be read simultaneously.

The potential drop measured across each pair of contact points will be sent to an amplifier 208 via the measurement switching mechanism 206. It is to be appreciated that a number of amplifiers will be equal to the number of pairs of contact points of the monitoring area 118. In the first state of the measurement switching mechanism 206, the potential drop read from the contact points 122, 124 of the reference component 116 will be sent to each of the plurality of amplifiers 208 to calibrate the amplifiers. In the second state of the measurement switching mechanism 206, the potential drop across each pair of contact points of the monitoring area 118 will be sent to its respective amplifier.

The amplified potential drop values read from the monitoring area 118 are then sent to a plurality of analog-to-digital (A/D) converters 210. It is to be understood the number of A/D converters 210 will be equal to the number of amplifiers 208. The A/D converters 210 will read the values from the amplifiers 208 upon receiving a read signal from the first microcontroller 203. The converted values will be sent to a second microcontroller 212 for processing to determine effects to the structure and for data logging. The second microcontroller 212 may also include a memory, e.g., a non-volatile EEPROM memory, for short or long term data storage.

The monitoring apparatus may also include a display 216 for displaying values at the site of monitoring. Additionally, the monitoring apparatus may include a communication module 218 for transferring the data to a central system. The communication module 218 will be adapted with a hard-wired connection port for downloading data to the central system and/or a wireless module for wirelessly transferring the data to the central system.

The second microcontroller 212 will have a multi-channel interface for receiving each potential drop value of the pairs of contact pairs simultaneously. By reading the potential drops simultaneously, the monitoring apparatus 112 effectively reduces measurement noise traditionally associated with conventional monitoring systems that read sequentially multiplexed data. The multi-channel microcontroller 212 also allows the monitoring apparatus 112 to save power since the drive current only needs to be turned on for a relatively short period of time compared to a multiplexing measurement system, which requires the current to remain on until all measurements are recorded. This in turn means that the monitoring apparatus 112 can operate off of a smaller battery for a longer period of time to perform signal averaging to obtain more reliable data than with a multiplexed system.

Generally, the invention uses very little power in between measurements. This extends the battery life and allows longer-term data to be collected. Statistical tools can be applied to the long term data to further improve the precision and drift performance of the measurements. The invention employs multiple A/D converters that synchronize and operate in parallel to minimize the amount of time that the drive current needs to be activated during the measurements. This reduces the power consumption and facilitates long-term operation. This also facilitates the use of statistical signal processing on the data to reduce common-mode noise present on all of the measurement channels, which would not be possible if the data channels are not simultaneously sampled.

Figure 3:
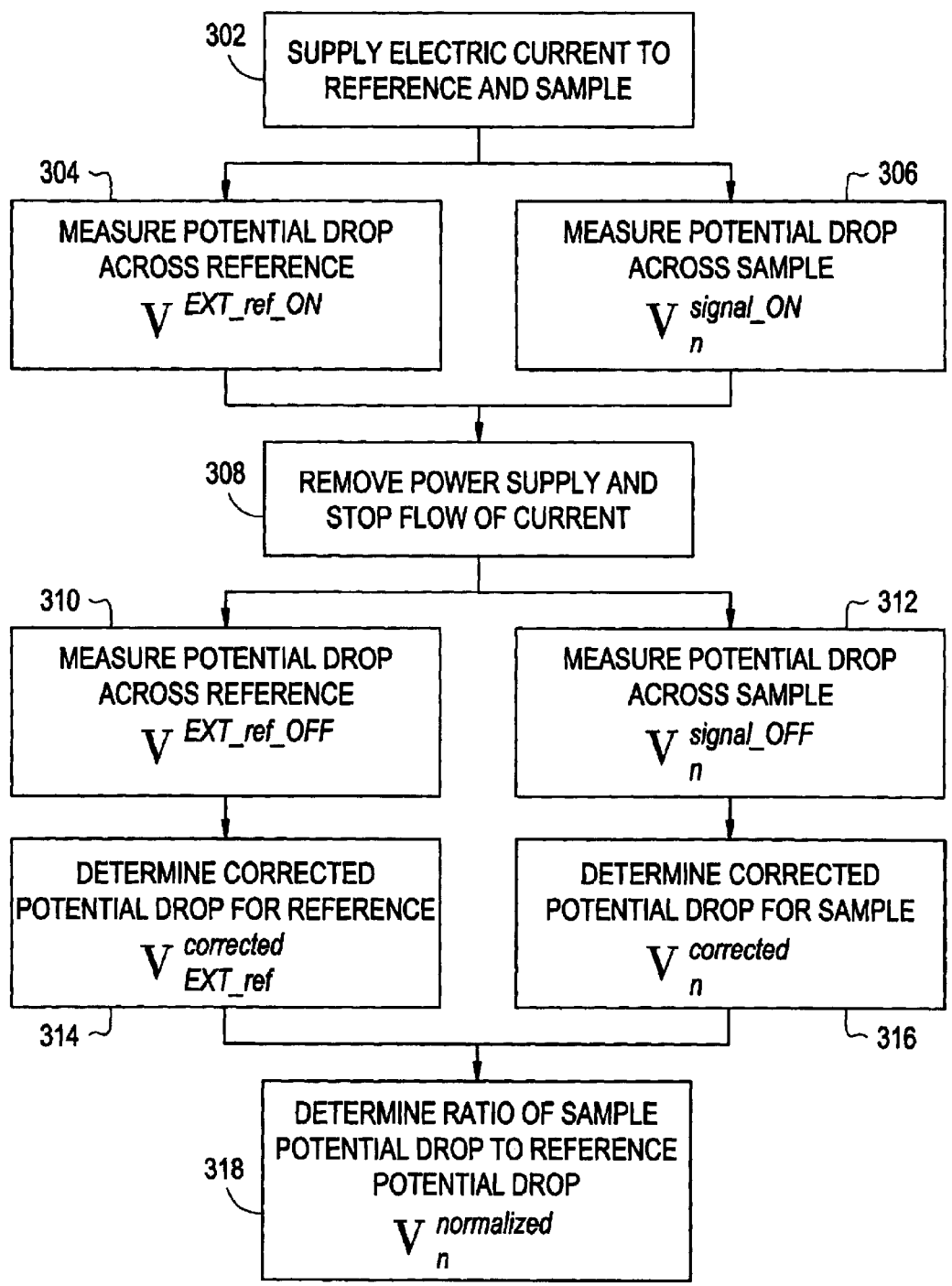
FIG. 3 is a flowchart illustrating a method for monitoring defects in a structure.

A method for monitoring defects in a structure will be described below in conjunction with FIG. 3.

Initially, the power supply 202 will supply electric current to the reference component 116 and sample via current injection ports 120, 130 (step 302). The current switching mechanism 204 and the measurement switching mechanism 206 will be in their first states. After the gain of the amplifiers 208 are set as described above, the measurement switching mechanism 206 will switch to its second state as to read potential drop values of the monitoring area 118 of the structure.

The potential drop across the reference $V^{EXT\_ref\_ON}$ will then be read via contact points 122, 124 (step 304) and the potential drop across the sample $V_n^{signal\_ON}$ will be read via contact points 126, 128 (step 306), where n is a channel associated with the pair of contact points. The current switching mechanism 204 will then enter its second state stopping the current flowing through the reference and sample (step 308). With the current stopped, e.g., the off-state, the potential drop across the reference $V^{EXT\_ref\_OFF}$ will be read (step 310) and the potential drop across the sample $V_n^{signal\_OFF}$ will also be read (step 312).

The corrected potential drop for the reference will then be determined by subtracting the first potential drop value by the off state potential drop value and dividing the difference by an internal reference voltage of the monitoring apparatus 112 (step 314) as follows:

$$V_{EXT\_ref}^{corrected} = \frac{V^{EXT\_ref\_ON} - V^{EXT\_ref\_OFF}}{V_n^{INT\_ref\_ON} - V_n^{INT\_ref\_OFF}} \qquad (2)$$

where $V_n^{INT\_ref\_ON}$ is an internal reference voltage reading of the nth channel while current is applied and $V_n^{INT\_ref\_OFF}$ is an internal reference voltage of the nth channel with no current applied. The same calculation will be performed for the sample (step 316) as follows:

$$V_n^{corrected} = \frac{V_n^{signal\_ON} - V_n^{signal\_OFF}}{V_n^{INT\_ref\_ON} - V_n^{INT\_ref\_OFF}} \qquad (3)$$

The two-state voltage measurements ($V_n^{signal\_ON} - V_n^{signal\_OFF}$) are subtracted to eliminate parasitic thermocouple voltages and the internal reference voltage readings ($V_n^{INT\_ref\_ON} - V_n^{INT\_ref\_OFF}$) are employed to compensate for channel gains and DC offsets.

The corrected potential drop for the sample is then divided by the corrected potential drop of the reference yielding a ratio that represents the difference between the current flow between the reference and the sample (step 318) as follows:

$$V_n^{normalized} = \frac{V_n^{corrected}}{V_{EXT\_ref}^{corrected}} \qquad (4)$$

This ratio is directly related to the difference between the material thickness in the sample and the reference.

Several readings for each pair of contact points may be taking over time and averaged to reduce random noise. The values for each pair of contact points, or channel, can then be mapped out in a matrix to associate the values with the physical location of the contact points. The matrix of values can then be displayed to a user for quickly identifying thinning areas of the structure.

Furthermore, potential drop readings ($V_n^{normalized}$) may be taken with the injection current applied in different directions, for example, along the path from current injection port 132 to current injection port 134. The multi-path current injection improves the characterization of oddly-shaped corrosion regions compared to single-port current injection. By injecting current along multiple paths, the monitoring system 110 can reconstruct the shape of the corrosion region more accurately since the potential drop is measured along two orthogonal directions instead of just one direction. The invention also uses multiple current injection paths to improve sensitivity of the monitoring system to crack-type defects in the pipe. For example, if the crack is axially oriented, it will strongly affect the circumferential current flow pattern but only minimally affect the axial current flow.

The readings obtained from the different directions of injection current paths may be analyzed individually as separate potential drop images or combined in vector form to obtain both a magnitude and direction component to the potential drop reading, which can be displayed in a matrix relating to the physical locations of the contact points.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A system for monitoring defects in a structure, the system comprising:
    a power supply for supplying a direct current to a monitoring area of the structure and a reference;
    a measurement circuit for measuring a potential drop across at least two contact points of the monitoring area and at least two contact points of the reference; and
    a processor having a multi-channel interface for simultaneously receiving potential drops, wherein the processor is adapted to directly measure the effects of defects in the structure through a determination of a ratio of the monitoring area potential drop to the reference potential drop indicative of a percentage change in a thickness of the structure.

2. The system as in claim 1, wherein the reference is of a same material as the structure.

3. The system as in claim 1, wherein the reference is electrically coupled to the structure.

4. The system as in claim 3, wherein the reference includes a first current injection port for coupling the power supply to the reference and the structure includes a second current injection port for coupling the power supply to the structure, wherein current will flow from the first current injection port to the second current injection port.

5. The system as in claim 3, wherein the reference includes a plurality of current injection ports for coupling the power supply to the reference and the structure includes a plurality of current injection ports for coupling the power supply to the structure, wherein a plurality of currents may be applied in different directions across the reference and structure.

6. The system as in claim 1, wherein the monitoring area includes a plurality of contact points arranged in a matrix for measuring a potential drop across any pair of contact points.

7. The system as in claim 6, wherein the measuring circuit measures the plurality of contact points simultaneously.

8. The system as in claim 1, wherein the power supply is a direct current battery.

9. The system as in claim 1, further comprising a display for displaying a value of the ratio in an approximate location on the structure.

10. The system as in claim 1, further comprising a communication module for transferring the measured potential drops and the ratio to other systems.

11. A method for monitoring defects in a structure, the method comprising the steps of:
    supplying a direct current to a monitoring area of the structure and a reference;
    measuring a first potential drop across at least two contact points of the monitoring area while simultaneously measuring a first potential drop across at least two contact points of the reference;
    directly measuring the effects of defects in the structure by determining a ratio of the monitoring area potential drop to the reference potential drop indicative of a percentage change in a thickness of the structure; and
    simultaneously communicating each of said first potential drops to a processor to enable the processor to read each of the potential drops simultaneously.

12. The method of claim 11, wherein the measuring step includes measuring a second potential drop across the at least two contact points of the monitoring area and a second potential drop across the at least two points of the reference with no current supplied.

13. The method of claim 12, wherein the measuring step includes the steps of:
    calculating the monitoring area potential drop by subtracting the first monitoring area potential drop with the second monitoring area potential drop; and
    calculating the reference potential drop by subtracting the first reference potential drop with the second reference potential drop.

14. The method of claim 13, wherein the calculating step includes the steps of:
    calculating a corrected monitoring area potential drop by dividing the monitoring area potential drop by an internal voltage drop of a measuring circuit; and
    calculating a corrected reference potential drop by dividing the reference area potential drop by the internal voltage drop of the measuring circuit.

15. The method as in claim 11, wherein the measuring step includes measuring a plurality of potential drops across the at least two contact points and averaging the plurality of potential drops to determine the first monitoring area potential drop.

16. The method as in claim 11, wherein the monitoring area of the structure includes a plurality of contact points and the measuring step includes measuring a potential drops across the plurality of contact points simultaneously.

17. The method as in claim 16, further comprising the step of displaying the measured potential drops of the plurality of contact points in relation to a physical location of the structure.

18. The method as in claim 11, further comprising the steps of:
    supplying the direct current in a plurality of paths sequentially; and
    measuring the potential drops across the at least two contact points of the monitoring area for each current path supplied.

19. The method as in claim 18, further comprising determining a vector corresponding to the measured potential drops, the vector including a magnitude component and a direction component.

20. The method as in claim 19, further comprising displaying the vector in relation to a physical location of the structure.

* * * * *